(12) United States Patent
Gharabally et al.

(10) Patent No.: US 8,650,561 B2
(45) Date of Patent: Feb. 11, 2014

(54) SYSTEM AND METHOD FOR LOCALIZING DISPLAY OF APPLICATIONS FOR DOWNLOAD

(75) Inventors: Sam Gharabally, San Francisco, CA (US); Ricardo Cortes, Los Gatos, CA (US); David Makower, Milpitas, CA (US); Yoon Sub Hwang, Alameda, CA (US)

(73) Assignee: Apple Inc., Cupertino, CA (US)

( * ) Notice: Subject to any disclaimer, the term of this patent is extended or adjusted under 35 U.S.C. 154(b) by 983 days.

(21) Appl. No.: 12/171,219

(22) Filed: Jul. 10, 2008

(65) Prior Publication Data
US 2010/0011354 A1 Jan. 14, 2010

(51) Int. Cl.
G06F 9/445 (2006.01)
G06F 9/45 (2006.01)

(52) U.S. Cl.
USPC ............................ 717/178; 717/136; 717/137

(58) Field of Classification Search
None
See application file for complete search history.

(56) References Cited

U.S. PATENT DOCUMENTS

| | | | | |
|---|---|---|---|---|
| 6,469,713 B2* | 10/2002 | Hetherington et al. | ........ | 715/740 |
| 6,623,529 B1* | 9/2003 | Lakritz | ............................ | 715/205 |
| 6,993,568 B1* | 1/2006 | Hauduc et al. | ................. | 709/217 |
| 7,007,026 B2* | 2/2006 | Wilkinson et al. | ...................... | 1/1 |
| 7,013,263 B1* | 3/2006 | Isaka et al. | ........................... | 704/9 |
| 7,234,110 B2* | 6/2007 | Sumitomo | ..................... | 715/234 |
| 7,340,389 B2* | 3/2008 | Vargas | ............................... | 704/8 |
| 7,437,406 B2* | 10/2008 | Hauduc et al. | ................. | 709/203 |
| 7,447,624 B2* | 11/2008 | Fuhrmann | .......................... | 704/8 |
| 7,461,123 B2* | 12/2008 | Hauduc et al. | ................. | 709/203 |
| 7,490,081 B2* | 2/2009 | Best et al. | .............................. | 1/1 |
| 7,627,867 B2* | 12/2009 | Banks | .......................... | 717/170 |
| 7,757,227 B2* | 7/2010 | Duplessis et al. | ............. | 717/173 |
| 7,925,243 B2* | 4/2011 | McGary | ..................... | 455/414.1 |
| 7,970,784 B2* | 6/2011 | Bode | ............................. | 707/760 |
| 2002/0133523 A1* | 9/2002 | Ambler et al. | ................... | 707/536 |
| 2003/0115552 A1* | 6/2003 | Jahnke et al. | .................. | 715/536 |
| 2003/0149557 A1* | 8/2003 | Cox et al. | .......................... | 704/2 |
| 2003/0182632 A1* | 9/2003 | Murdock et al. | .............. | 715/536 |
| 2004/0268311 A1* | 12/2004 | Pizzoli et al. | .................. | 717/124 |
| 2005/0138111 A1* | 6/2005 | Aton et al. | ..................... | 709/201 |
| 2005/0251562 A1* | 11/2005 | Hauduc et al. | ................. | 709/217 |
| 2005/0267889 A1* | 12/2005 | Snyder et al. | ................... | 707/10 |
| 2006/0080082 A1* | 4/2006 | Ravindra et al. | .................. | 704/8 |
| 2006/0080083 A1* | 4/2006 | Lin et al. | ........................... | 704/8 |

(Continued)

FOREIGN PATENT DOCUMENTS

KR 2007105946 A * 10/2007

*Primary Examiner* — Don Wong
*Assistant Examiner* — Daxin Wu
(74) *Attorney, Agent, or Firm* — Novak Druce Connolly Bove + Quigg LLP (57) ABSTRACT

Localizing display of applications for download, the method including receiving from a developer and ingesting into an online store an application localized in different languages, including a designated default language, determining a local language of a user desiring to download the application from the online store, presenting to the user an interface to download a version of the application in the user's local language if the application is available in the user's local language, and presenting to the user an interface to download the version of the application in the designated default language if the application is unavailable in the user's local language. In the case of people who speak more than one language, determining a local language of a user further includes determining one or more secondary local languages and/or assigning an order of priority to the secondary languages.

30 Claims, 6 Drawing Sheets

(56) References Cited

U.S. PATENT DOCUMENTS

| | | | |
|---|---|---|---|
| 2006/0116864 A1* | 6/2006 | McHugh et al. ................... | 704/2 |
| 2006/0117304 A1* | 6/2006 | Anastassopoulos et al. . | 717/136 |
| 2006/0130006 A1* | 6/2006 | Chitale ......................... | 717/136 |
| 2006/0130031 A1* | 6/2006 | McHugh et al. .............. | 717/162 |
| 2006/0143605 A1* | 6/2006 | Cao ............................... | 717/174 |
| 2006/0150098 A1* | 7/2006 | Ma ................................ | 715/542 |
| 2007/0244691 A1* | 10/2007 | Alwan et al. ..................... | 704/8 |
| 2008/0052704 A1* | 2/2008 | Wysocki ....................... | 717/173 |
| 2008/0082317 A1* | 4/2008 | Rosart et al. ...................... | 704/8 |
| 2008/0163202 A1* | 7/2008 | Kembel et al. ................. | 717/178 |
| 2008/0168052 A1* | 7/2008 | Ott et al. .......................... | 707/5 |
| 2008/0301562 A1* | 12/2008 | Berger et al. ................. | 715/733 |
| 2009/0037830 A1* | 2/2009 | Kulkarni et al. .............. | 715/764 |
| 2009/0083025 A1* | 3/2009 | Hauduc et al. .................... | 704/8 |
| 2009/0094609 A1* | 4/2009 | Burukhin et al. ............. | 718/104 |
| 2009/0171847 A2* | 7/2009 | Bhambri et al. ............... | 705/59 |
| 2009/0276206 A1* | 11/2009 | Fitzpatrick et al. ............... | 704/2 |
| 2011/0137926 A1* | 6/2011 | Chen ........................... | 707/760 |
| 2012/0095837 A1* | 4/2012 | Bharat et al. ............... | 705/14.54 |

* cited by examiner

300 http://www.onlinestore.com/localize · Q: Google

Downloads | Support | Q: Search

Edit Application

| Overview | Upload | Pricing | Localization | Review |

302 — ⊕ English   ⊕ German   ⊕ Italian   ⊕ Spanish

Please provide the following information in German.

304 — Application Name: [Name Prepopulated] ⓘ
306 — Application Description: [ ] ⓘ
308 — What's New In This Version: [ ] ⓘ

310 {
  Application Website URL: [http//www.urlhere.com] ⓘ
  Support URL: [http//www.supporturl.com] ⓘ
  Support Email Address: [ ] ⓘ
}

312 — EULA Text: [ ] ⓘ

Upload localized screenshots or click Continue to use ones that were already uploaded.

314 — Upload Primary 480x320 Screenshot ⓘ
[ ]
[Choose File]

316 — Upload up to Four 480x320 Screenshots ⓘ
[1] [2] [3] [4]
[Choose File]

318 — [Add Another Language]   320 [Save Changes]

SYSTEM AND METHOD FOR LOCALIZING DISPLAY OF APPLICATIONS FOR DOWNLOAD

BACKGROUND OF THE INVENTION

1. Field of the Invention

The present invention relates to software localization and more specifically to allowing users worldwide to purchase localized software in their own language.

2. Introduction

Traditional software distribution through retail outlets is expensive, slow, and wasteful. Boxed software for purchase in a retail store is cost-inefficient because physical media must be designed, duplicated, packaged, transported, and displayed in a retail store where it may or may not be purchased right away. Other durable goods do not depreciate quickly and can sit on store shelves for years, if not decades, without significant adverse effects. Software, on the other hand, has a relatively short life span and the costs of distribution and inventory can quickly place a large burden on a small software development company. Retail software is maddeningly slow, given the rapid pace of software development. New versions are written frequently, which drives obsolescence of old versions. Retail packaging is often large and bulky, using a significant amount of plastic and paper to display, secure, and deliver a small disc or other media. For these and other reasons, software developers are investigating and shifting to online distribution where possible.

Online distribution of software has opened a new market for many small and medium software developers. The barriers to software publication and distribution are greatly diminished, meaning that software developers can publish their product on the Internet at a miniscule fraction of the cost of retail distribution. But this new market presents a significant opportunity and a significant problem. Once a software product is available online, many people from all over the world can potentially purchase the software. The market is much larger, leading to a higher chance of success as measured by raw sales, but the worldwide market is more linguistically diverse than the United States. United States Census results from 2000 show that 95.8% of Americans over 5 years of age speak English, whereas data from 2005 indicate that only approximately 25% of world inhabitants have a basic knowledge of English and only 5.4% of world inhabitants speak English natively. In traditional retail distribution in the United States alone, a software product developed in only one language adequately covers the majority of the population. In a worldwide market, restricting a product to one or two languages significantly confines the total possible sales.

Accordingly, what is needed in the art is an improved way for software developers to allow access to their software in different languages.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for localizing display of applications for download, the method including receiving from a developer and ingesting into an online store an application localized in different languages, including a designated default language, determining a local language of a user desiring to download the application from the online store, presenting to the user an interface to download a version of the application in the user's local language if the application is available in the user's local language, and presenting to the user an interface to download the version of the application in the designated default language if the application is unavailable in the user's local language.

In one aspect, a list of all available localized versions is presented to the user. In another aspect, statistics about when the user desires an unavailable localized version are recorded and reported to the developer. One variation includes receiving from the user a request for an unavailable localized version, and forwarding the request to the developer. To assist a customer in selecting a proper localized version, the method can display to the user one or more representative screenshots of the localized application. In the case of people who speak more than one language, determining a local language of a user further includes determining one or more secondary local languages and/or assigning an order of priority to the secondary languages.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
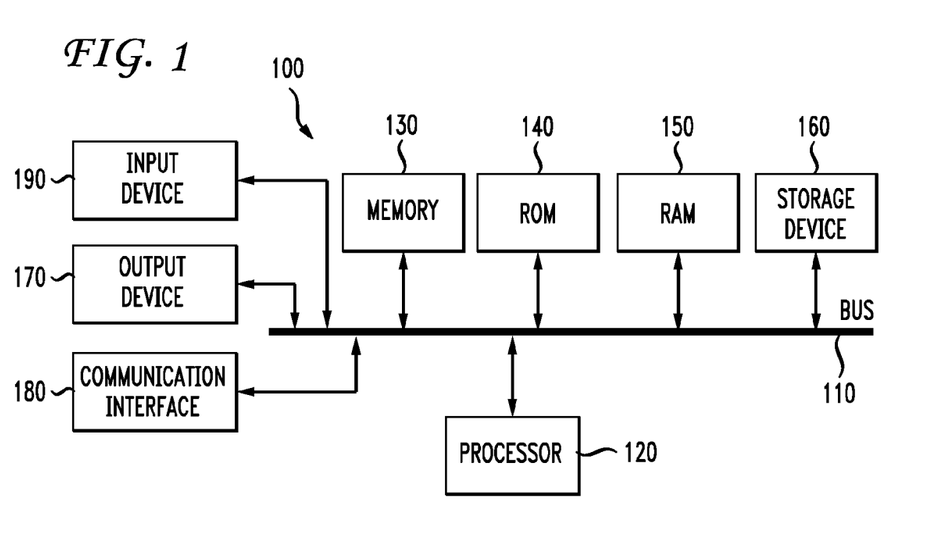
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
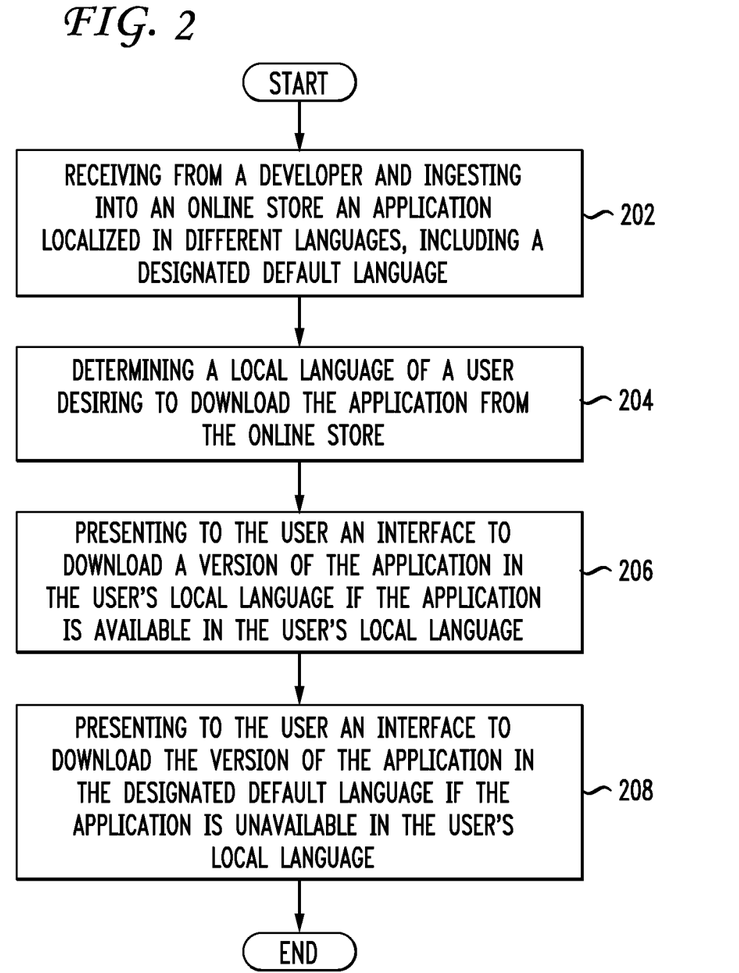
FIG. 2 illustrates an example method embodiment.

FIG. 2 illustrates an example method embodiment for localizing display of applications for download. First, the method includes receiving from a developer and ingesting into an online store an application localized in different languages, including a designated default language (202). Developers include individual programmers and entities such as a nonprofit organization or a corporation. An application is a software program for use on a computing device. Applications can include metadata, supporting software libraries, configuration files, documentation, developer contact information, license agreements, etc. One way to localize an application is to extract text strings, replace them with a lookup in a language table, and substitute one language table with another. In this context, a developer can accomplish software localization by compiling multiple localized builds of the same version of software or compiling one universal build that includes text strings in a table for each language. The designated default language may be the language of the developer or any other default language.

In one aspect, a software application is localized by creating a bundle that contains the software application binary, application metadata (such as screenshots, small icons, large icons, sound schemes, audio alerts, category, copyright date, authors, licensing information, etc.), and localization information for one or more language. Essentially, one version of the application is generated with all the necessary components combined. Store front metadata is stored independent of the binary. Storefront metadata, application metadata, screenshots, etc. can be localized for multiple languages. Storefront metadata can include information like price, author, program size, short program description, long program description, genre, related programs, popularity index, user reviews, etc. One example of store front metadata in the context of video game applications is game ratings, similar to movie ratings like PG-13 and R. In the United States, game ratings include E for Everyone, E10+ for children 10 or older, T for Teen, and M for Mature. Other countries do not use this game ratings system. For instance, Japan uses a rating system of A for all ages, B for 12 and up, C for 15 and up, D for 17 and up, and Z for 18 and up. Europe uses a rating system of 3+, 7+, 12+, 16+, and 18+as well as specific content descriptors for bad language, discrimination, drugs, sex, etc. The game rating system is one scenario where store front metadata regarding video games can be localized for foreign regions, such as Japan, or Europe. As an example, a European video game having a rating of 12+ plus a specific content descriptor for violence could be localized in the online store for the United States by approximating the 12+ rating with a T for Teen rating.

A developer can maintain different versions of an application with different localization information. For example, a developer may not localize version 1.0 of a software application and opt to publish in English only. After surveying customer demand, the developer finds high demand for the application in Europe, so the developer localizes version 2.0 in English, German, and French. By version 3.0, demand has spread to Asia, so the developer further localizes the application in Japanese and Russian. The online store treats each version (1.0, 2.0, and 3.0) as a separate and distinct, albeit related, software application with its own localizations. If desired, a developer can update localizations of existing versions. For instance, if the French localization of version 2.0 has an embarrassing or confusing translation, the developer can edit or replace the localization errors. An online store can provide a mechanism to notify users of updated localizations or automatically update localized programs over a network. Developers can also add new localizations to existing applications. For example, if version 3.0 is not desired in Thailand for compatibility reasons, but version 2.0 is desired, the developer can return to version 2.0 and localize it in Thai.

The developer designates one language as the default language. The default language designation can be an explicit designation or it can be determined from implicit information, such as the first language transmitted to the online store or the location of the developer. For example, a Canadian software developer who localizes an application in French, Spanish, and English can explicitly designate French as the default language. When a developer in the United Kingdom localizes an application in English and Māori, but does not explicitly designate a default language, the online store can infer that English or another designated language is the default language. The online store can also prompt the user to indicate a default language. The developer can select a default language other than his own native language. For example, a Finnish software developer may write a program and specify that the default is in English because English is more commonly spoken than his native Finnish. The default language may be dynamically selected as well, based at least in part on the location of the user and demographic information of the region. Dynamic default language selection can be performed on a per-user basis, per region basis, or a per application basis.

A software application is ingested into an online store by incorporating the application and/or any associated metadata into the databases of the online store. The store then makes the application available to users to browse, view information, purchase, and/or download. A developer can disable or enable public access to software ingested into the online store. A developer can maintain a version history of a software application. For example, version 1.0, 1.1, 1.2, and 2.0 can all be stored and ingested into the store, but the developer may only allow public access to versions 1.2 and 2.0. A developer may wish to disallow access to older versions if known security bugs exist in older versions, for instance.

Second, the method includes determining a local language of a user desiring to download the application from the online store (204). The local language of the user can be determined by prompting the user to input a desired language. The local language can be determined by the localization settings of the user's operating system or online store interface software. For example, if the user's operating system is in Western Spanish, the online store system determines that the user's local language is Spanish. If the user downloaded and installed a software package to interface with an online store, such as iTunes, in French, the system determines that the user's local language is French.

The local language can be based on a user profile. The user profile can be stored on a playback device, on a personal computer, on a server, or any combination. The local language can be based on previous purchases from the online store. For example, if the user downloads seven of the last ten applications in French, the local language is set to French. The local language can be inferred from geographic location, IP address, ISP, country of origin, etc. A user located in Mexico City is shown applications localized in Spanish. A user in Moscow is shown applications in Russian. In one aspect, the system includes different localized store fronts for each region, and the system selects a local language for the user based on the language of the localized store front. For instance, a United States storefront is in English whereas foreign store fronts are in their respective languages. Further, dialects of one language can be considered as different languages. One familiar example of this aspect is British English, American English, and Australian English. The core of each dialect is essentially the same, but some terms and phrases are different. Different localizations can be provided for each dialect of a language as needed. This principle also may also be applied to localize for dialects within a nation, such as Ozark Southern English, New York City English, and Hawaiian English.

In some countries, like Luxembourg, two or more languages are considered native. In such instances, the exemplary system determines one or more secondary local languages. In Luxembourg, the local language can be German and secondary local languages can be French and Luxembourgish. In Armenia, the local language can be Armenian and the secondary local language can be Russian. A user can explicitly specify a secondary local language. When secondary languages are present, they can be assigned an order of priority. For example, in Luxembourg, a particular user is more comfortable reading and writing Luxembourgish, so the user specifies Luxembourgish as the first priority and French as the second priority. The priority means that the first priority language, if available, will be shown. Only if the first priority language is unavailable is the second priority language shown.

The local language can be determined based on a combination of any or all of these factors. When factors indicate a conflict or ambiguity between possible local languages, a mechanism can be provided to determine the most likely local language. The mechanism can assign a weight to different factors to make the determination. For example, the operating system language can be assigned a much higher weight than the language of a previous purchase from the online store. One example of how multiple factors can interact is an American tourist who takes his laptop computer to Germany and uses it to connect to the online store. While geographic factors indicate that German should be the local language, the laptop operating system and iTunes software are both in English. The English factors weigh more heavily than the German factors, so English is chosen as the local language despite the geographic location of the tourist.

Third, the method includes presenting to the user an interface to download a version of the application in the user's local language if the application is available in the user's local language (206). If the user's local language is French and the application is available in French, then the French localized version is shown. When the localized application is displayed, one or more representative screenshots of the localized application can be displayed as well. When dealing with a potential language barrier, such a feature may be advantageous to ensure that the user is downloading the application he or she desires. All or part of any localized application metadata can also be displayed.

Fourth, the method includes presenting to the user an interface to download the version of the application in the designated default language if the application is unavailable in the user's local language (208). For example, if the user's local language is French but the application is unavailable in French, then the default version is shown. In this instance where a user's first choice or first preference of language is unavailable and any secondary languages, if present, are also unavailable, the exemplary system can present a list of all available localized versions to the user. An operator of an online application store can record statistics about when a user desires an unavailable localized version and report those statistics to developers. The online store has incentive to demonstrate nascent demand for localized versions to developers of a software application because additional localizations can lead to more sales. Another way to inform developers about demand for unavailable languages is to receive from the user a request for an unavailable localized version and forward the request to the developer. This can operate as a suggestion box of sorts. Users request an application in an unavailable language and developers get the message. In either case, the developer makes the ultimate choice to localize or not localize in a particular language. The statistics or specific requests for unavailable languages allow developers to make an informed cost-benefit analysis when deciding whether to create new localizations.

Figure 3:
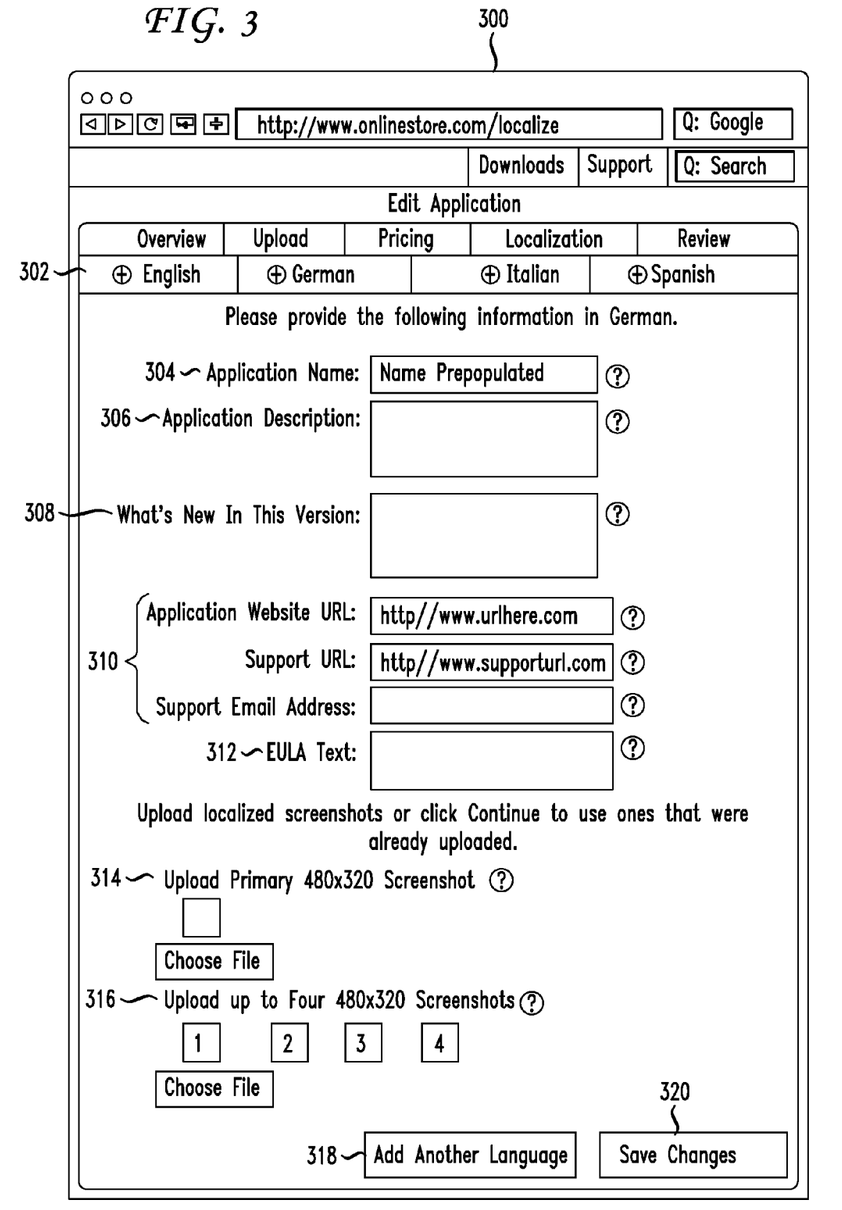
FIG. 3 illustrates a sample interface for developers to upload a localized application.

FIG. 3 illustrates an example interface for a developer to upload a localized application. Although the interface 300 shown is a web page, the interface can be part of a software application capable of communicating over a network with an online store. Other interface arrangements and/or layouts can be implemented in keeping with the spirit of the principles described herein. FIG. 3 is exemplary and should not be construed as limiting the scope or coverage of the disclosure. At the top of the illustrated interface, a set of tabs 302 are shown, one tab for each localized language version of the application. The developer adds the application name 304 in the appropriate language. Each of the fields shown in this interface may be populated in advance with the original or default language information to remind the developer of the original content.

Alternately, the original can be shown to the side of the input fields to allow a developer to easily and quickly compare the translation with the original. In another aspect, an on-screen foreign language keyboard can be displayed to assist the developer in typing characters which do not appear on his or her physical keyboard. For example, in Spanish, the character "ñ" is commonly used, but not readily available on an English keyboard. When a Spanish language tab is opened, the system can pop up a partial on-screen keyboard with special characters in the target language which are not found on an English keyboard, including "ñ". When the target language and the physical keyboard language share no characters at all, such as Arabic and English, the entire foreign keyboard can be shown on screen.

The developer further adds localized strings for the application description 306, what's new in this version 308, support information 310, and end-user license agreement (EULA) text 312. Further, the developer can upload one or more screenshots to demonstrate the localized version of the program to prospective customers. In this example, a primary screenshot 314 is allowed, in addition to up to 4 additional screenshots 316. Screenshots allow a customer to view a representative sampling of the application. Screenshots help customers avoid the risk of purchasing a localized application that has a bad translation, is in the wrong language, doesn't do exactly what the customer expected, etc. When more than one language is used, the language barrier creates an additional dimension of potential problems. When developers provide as much information as possible, many language barrier problems are alleviated. In one aspect, the screenshots include application icons. Sometimes icons include portions that are language specific. These icons can be customized for each localized version of the software. A developer can provide multiple sizes and qualities of any or all icons.

After the developer has finished entering information regarding a localized version of a software application, the developer can click the button to Add Another Language 318 or Save Changes 320. Adding another language can move to another unpopulated tab or can prompt the user to create a new tab.

Figure 4A:
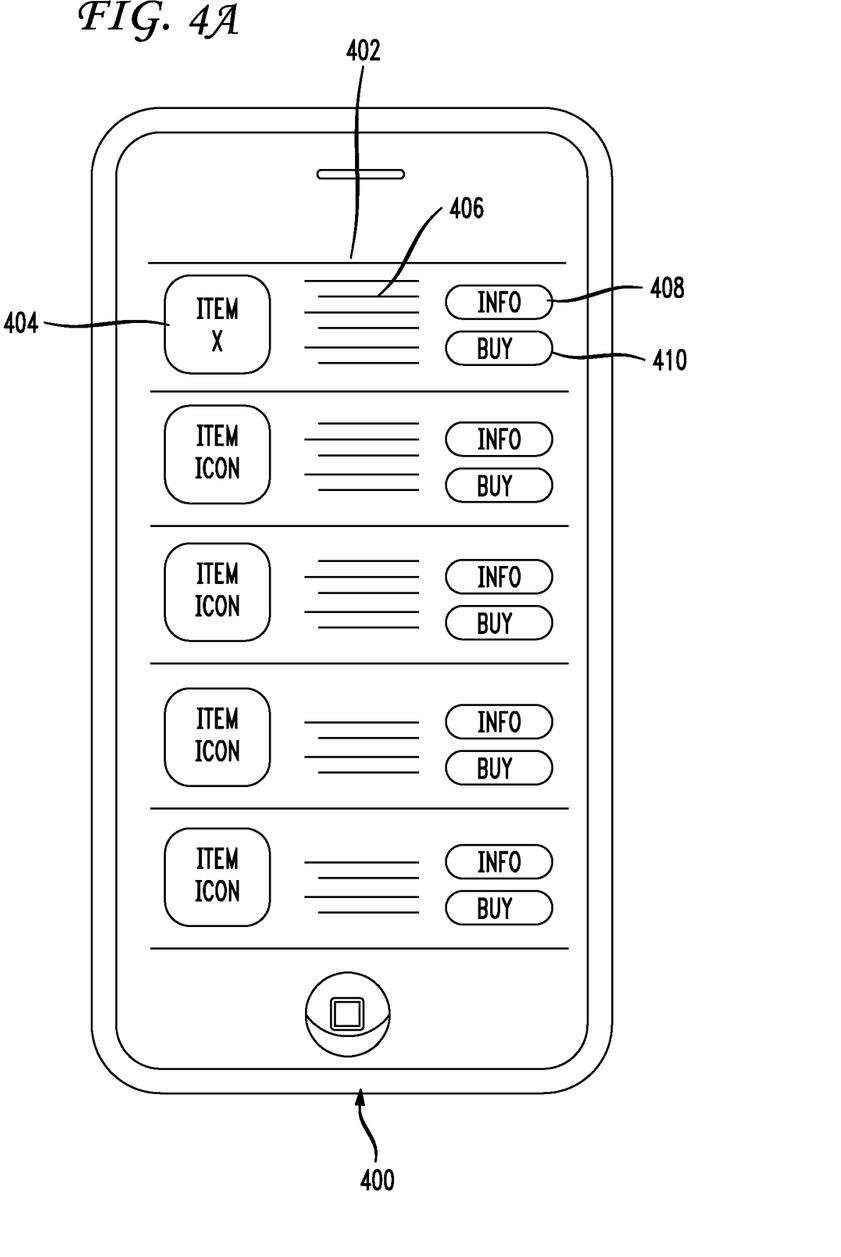
FIG. 4A illustrates an example interface displaying a list of applications to a user.

FIG. 4A illustrates an example interface displaying a list of applications to a user via a mobile device 400 which includes a graphical display 402. The list of applications for purchase or download is shown on the display. Each application in the list includes an icon 404, a short description 406, a button for detailed information 408, and a button to buy or download the application 410. The interface can also include a scroll bar or other indication that additional applications are available but not currently displayed. The user can interact with the interface via a keyboard, touching the screen with a finger, stylus, etc., voice commands, remote control, or other suitable input means. The icon 404 can be clickable and can lead to the same detailed information as the info button 408. Clicking the buy button 410 can lead to an additional interface verifying that the user's account will be charged and indicating an amount to be charged.

Figure 4B:
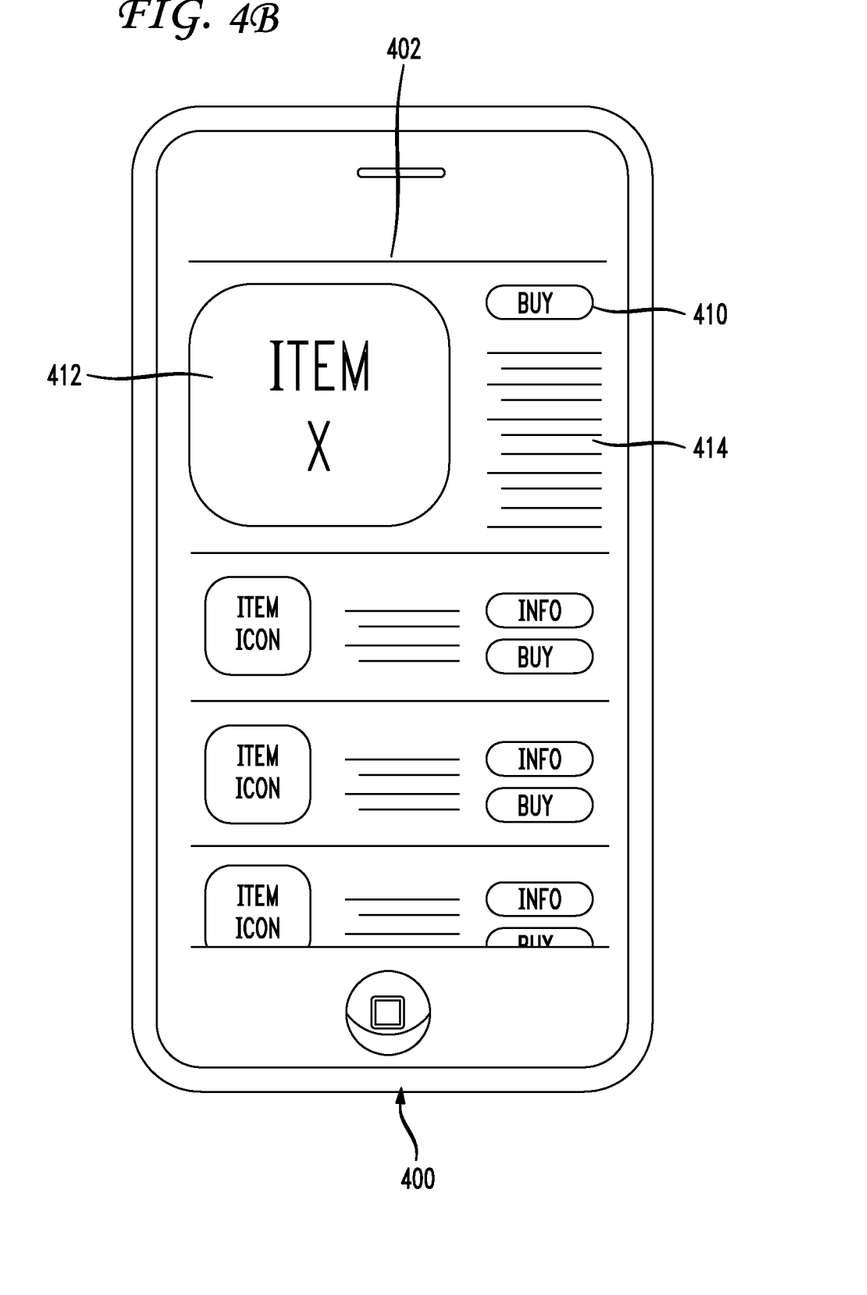
FIG. 4B illustrates an example interface displaying more information about one application to a user.

FIG. 4B illustrates an example interface displaying more information about one application to a user. When the user clicks the info button 408 or the icon 404, the associated application in the list is expanded to include a larger icon 412 and detailed information 414. The buy button 410 remains visible to allow the user to purchase the application. The remaining applications in the list can be pushed down to make room for the expanded display or the remaining applications can be removed from the display temporarily. The expanded information can indicate other localized versions as well. One way to indicate other localized versions is to provide a pull-down menu including each localized version in both the user's local language and the localized language. Some sample lines in a pull down menu indicating additional localized versions are "Español/Spanish", "Русский/Russian", and "Deutsch/German". In one aspect, the mobile device matches the language of the localized version of the application to the language of the labels of the info button 408 and buy button 410. Multiple applications can be expanded simultaneously to show additional information and compare them side by side. Expanded applications can remain in their places in the list, or expanded applications can be shown side by side for easy comparison of features or descriptions. In one aspect, when a user clicks on the larger icon, representative screenshots showing localized versions are shown.

Figure 5:
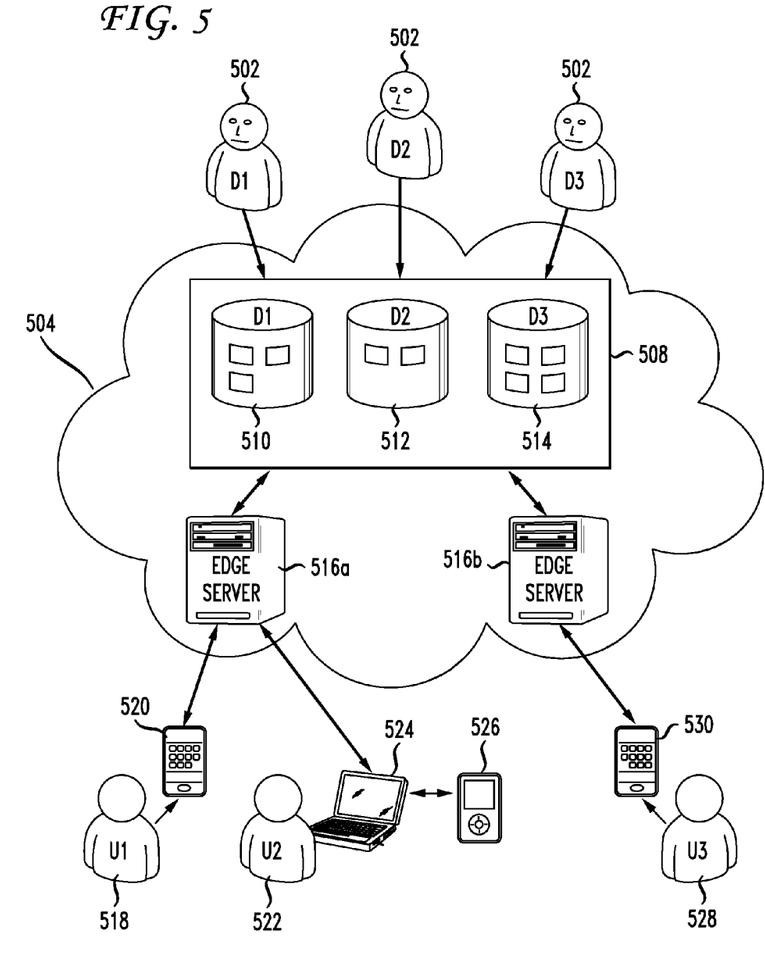
FIG. 5 illustrates an exemplary system for receiving, displaying, and selling localized applications in an online store.

FIG. 5 illustrates an exemplary system for receiving, displaying, and selling localized applications in an online store. Developers D1, D2, and D3 502 interact through a network 504 with an online store server 508. The online store server can be completely or partially located within the network cloud 504. The online store server can be embodied in multiple physical servers in one location or distributed worldwide. Different online store servers can be provided for different regions in the world. Multiple online store servers can sync or communicate continuously or periodically through a network. Other embodiments and implementations are possible. The interface for developers to interact with the online store server can be a web page or can be part of a separate software application. As developers upload software applications and localized versions of software applications, they are stored in the online store in a database for each developer 510, 512, 514. The database stores multiple applications and multiple localizations for each application. The online store server communicates with multiple end users 518, 522, 528 via edge servers 516a, 516b, such as those provided by Akamai. Edge servers can cache frequently accessed localized applications for quick access. Although edge servers are shown standing between the end users and the online store server, they are not required. End users may interface directly with the online store server through a network.

User 1 518 communicates with the online store server via a mobile device 520, such as an Apple iPhone, Palm Centro, BlackBerry Pearl, or HTC Touch Diamond that is connected to a Wi-Fi, Edge, or 3G wireless network. User 2 522 communicates with the online store server via software installed on a personal computer 524 such as an Apple iMac, Dell Vostro, or Sony Vaio with software such as iTunes or Real Rhapsody. User 2 522 syncs downloaded or purchased localized applications to a mobile computing device 526 such as the Apple iPod Classic, the Microsoft Zune 80, or the iriver DP250. Such an arrangement may be desirable when the mobile device is not network capable or the application is too large to download feasibly via a wireless mobile device connection, yet a user still desires to install applications on the mobile device. User 3 528 communicates with the online store server via a mobile device 530.

User 1 518 and User 2 522 download from the same edge server 516a, so each receives a display of the same localized language applications, barring some contrary user setting. User 3 528, on the other hand, downloads from a different edge server 516b, and receives a display of applications localized in a different language from User 1 518 and User 2 522. Edge servers in different locations can provide particular localized applications by default. For example, an edge server servicing Taiwan can provide localized applications primarily in Mandarin, while an edge server servicing Moscow can provide localized applications in Russian. Such edge servers can also cache the default localized applications in the event that the desired localization is unavailable. Where localized store fronts are provided in different regions, a dedicated edge server can serve each localized store front.

The online store can be accessed in a number of ways. Users can access the online store wirelessly on a mobile device in a format that is tailored to the reduced functionality of the mobile device. No matter how users access the online store, The principles described herein can be incorporated as part of an overall localization scheme to coordinate and/or unify, to the extent possible, localization of four components: (1) application metadata localization, (2) the online store front localization, (3) software client localization, and (4) localization of the software application binary itself. Changing the info 408 and buy 410 buttons in FIG. 4a to match the language the application is shown in is one example of coordinating localization.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to an online store accessible wirelessly by a portable media playback device or by a personal computer physically connected to a network. Those skilled in the art will readily recognize various modifications and changes that may be made to the present invention without following the example embodiments and applications illustrated and described herein, and without departing from the true spirit and scope of the present invention.

We claim:

1. A method for localizing display of applications for download, the method comprising:
    receiving, from a user device, a request to download a desired application, the desired application being localized in different languages;
    determining, by an online store, a local language associated with the user device, wherein determining the local language comprises:
        determining a plurality of factors associated with the user device, wherein each factor is associated with a secondary language and a weight;
        grouping the plurality of factors based on the secondary language to form a list of secondary languages;
        ranking the languages in the list of secondary languages according to the weight of each factor, and
        assigning a secondary language from the list of secondary languages as the local language according to the ranking; and presenting, by the online store, an interface to download a version of the desired application in the local language when the local language is one of the different languages.

2. The method of claim 1, wherein the factors include an application installed on the user device.

3. The method of claim 2, wherein the application is an operating system.

4. The method of claim 3, wherein the weight associated with the operating system is greater than the weight of other applications installed on the user device.

5. The method of claim 3, wherein the factors further include a geographic location of the user device and the weight associated with the operating system is greater than the weight associated with the geographic location.

6. The method of claim 1, wherein the factors include a user profile associated with the user device.

7. The method of claim 6, wherein the user profile includes a language of an application previously purchased from the online store.

8. The method of claim 1, wherein the factors include a language associated with a geographic location of the user device.

9. The method of claim 1, further comprising:
receiving, from the user, a request for a desired localized version of the desired application;
determining, by the online store, that the desired localized version is not one of the different languages;
recording statistics based on the determination; and
reporting the statistics to a developer of the application.

10. The method of claim 1, further comprising:
presenting, by the online store, one or more representative screenshots of the desired application in the local language when the desired application is one of the different languages.

11. A system, comprising:
a processor; and
memory having stored therein instructions which, when executed by the processor, cause the processor to perform steps comprising:
receiving, from a user device, a request to download a desired application, the desired application being localized in different languages;
determining, by an online store, a local language associated with the user device, wherein determining the local language comprises:
determining a plurality of factors associated with the user device, wherein each factor is associated with a secondary language and a weight;
grouping the plurality of factors based on the secondary language to form a list of secondary languages;
ranking the languages in the list of secondary languages according to the weight of each factor, and
assigning a secondary language from the list of secondary languages as the local language according to the ranking; and
presenting, by the online store, an interface to download a version of the desired application in the local language when the local language is one of the different languages.

12. The system of claim 11, wherein the factors include a language of an application installed on the user device.

13. The system of claim 11, wherein the factors include a user profile associated with the user device.

14. The system of claim 13, wherein the user profile includes a language of an application previously purchased from the online store.

15. The system of claim 11, wherein the factors include a language associated with a geographic location of the user device.

16. The system of claim 11, further comprising:
receiving, from the user, a request for a desired localized version of the desired application;
determining, by the online store, that the desired localized version is not one of the different languages;
recording statistics based on the determination; and
reporting the statistics to a developer of the application.

17. A non-transitory computer-readable medium storing a computer program having instructions for localizing display of applications for download, the instructions comprising:
receiving, from a user device, a request to download a desired application, the desired application being localized in different languages;
determining, by an online store, a local language associated with the user device, wherein determining the local language comprises:
determining a plurality of factors associated with the user device, wherein each factor is associated with a secondary language and a weight;
grouping the plurality of factors based on the secondary language to form a list of secondary languages;
ranking the languages in the list of secondary languages according to the weight of each factor, and
assigning a secondary language from the list of secondary languages as the local language according to the ranking; and
presenting, by the online store, an interface to download a version of the desired application in the local language when the local language is one of the different languages.

18. The non-transitory computer-readable medium of claim 17, wherein the factors include a language of an application installed on the user device.

19. The non-transitory computer-readable medium of claim 18, wherein the application is an operating system.

20. The non-transitory computer-readable medium of claim 17, wherein the factors include a user profile associated with the user device.

21. The non-transitory computer-readable medium of claim 20, wherein the user profile includes a language of an application previously purchased from the online store.

22. The non-transitory computer-readable medium of claim 17, wherein the factors include a language associated with a geographic location of the user device.

23. The non-transitory computer-readable medium of claim 17, further comprising:
receiving, from the user, a request for a desired localized version of the desired application;
determining, by the online store, that the desired localized version is not one of the different languages;
recording statistics based on the determination; and
reporting the statistics to a developer of the application.

24. The non-transitory computer-readable medium of claim 17, further comprising:
presenting, by the online store, one or more representative screenshots of the desired application in the local language when the desired application is one of the different languages.

25. The method of claim 1, wherein determining the local language further comprises:

identifying a conflict between two or more of the plurality of factors, wherein the weight associated with each of the two or more of the plurality of factors is based on the identified conflict.

26. The method of claim 1, wherein identifying the conflict between the two or more of the plurality of factors further comprises:
   determining that at least two of the plurality of factors are associated with a different secondary language, and
   wherein a greatest weight is associated with one factor, of the at least two of the plurality of factors, based on an indication that the one factor indicates a highest likelihood of a user language preference.

27. The system of claim 11, wherein the processor is further configured to perform steps comprising:
   identifying a conflict between two or more of the plurality of factors, wherein the weight associated with each of the two or more of the plurality of factors is based on the identified conflict.

28. The system of claim 27, wherein identifying the conflict between the two or more of the plurality of factors further comprises:
   determining that at least two of the plurality of factors are associated with a different secondary language, and
   wherein a greatest weight is associated with one factor, of the at least two of the plurality of factors, based on an indication that the one factor indicates a highest likelihood of a user language preference.

29. The non-transitory computer-readable medium of claim 17, the instructions further comprising:
   identifying a conflict between two or more of the plurality of factors, wherein the weight associated with each of the two or more of the plurality of factors is based on the identified conflict.

30. The non-transitory computer-readable medium of claim 29, wherein identifying the conflict between the two or more of the plurality of factors further comprises:
   determining that at least two of the plurality of factors are associated with a different secondary language, and
   wherein a greatest weight is associated with one factor, of the at least two of the plurality of factors, based on an indication that the one factor indicates a highest likelihood of a user language preference.

* * * * *